United States Patent [19]
Whitted

[11] Patent Number: 5,639,966
[45] Date of Patent: Jun. 17, 1997

[54] MACHINE HEIGHT MEASURING METHOD AND MACHINE HEIGHT MEASURING DEVICE FOR SURVEYING MACHINES

[75] Inventor: Norman C. Whitted, Kansas City, Mo.

[73] Assignee: Sokkia Co., Ltd., Tokyo, Japan

[21] Appl. No.: 544,166

[22] Filed: Oct. 17, 1995

[30] Foreign Application Priority Data

Oct. 17, 1994 [JP] Japan .................................. 6-275529

[51] Int. Cl.[6] .............................................. G01F 25/14
[52] U.S. Cl. .............................. 73/432.1; 33/299; 33/452; 33/453
[58] Field of Search .................... 73/432.1; 33/290, 33/299, 418, 419, 420, 452, 453, 456, 464, 474

[56] References Cited

U.S. PATENT DOCUMENTS

| | | | |
|---|---|---|---|
| 223,253 | 1/1880 | Soare | 33/452 |
| 325,134 | 8/1885 | Wainwright | 33/809 |
| 826,425 | 7/1906 | Heathcote | 33/452 |
| 1,039,057 | 9/1912 | Hill | 33/464 X |
| 2,465,530 | 3/1949 | Gerber | 33/452 X |
| 2,656,609 | 10/1953 | Siggson | 33/452 |
| 3,774,307 | 11/1973 | Yovanovich | 33/419 X |
| 4,641,435 | 2/1987 | Brown | 33/427 |
| 5,159,760 | 11/1992 | Spiegel et al. | 33/292 X |
| 5,406,713 | 4/1995 | Oman et al. | 33/299 X |

FOREIGN PATENT DOCUMENTS

| | | |
|---|---|---|
| 4-198809 A | 7/1992 | Japan . |
| 5-6318 | 1/1993 | Japan . |
| 5-248865 | 9/1993 | Japan . |
| 6-194168 A | 7/1994 | Japan . |

*Primary Examiner*—Elizabeth L. Dougherty
*Attorney, Agent, or Firm*—Kubovcik & Kubovcik

[57] ABSTRACT

A method of measuring machine height of a surveying machine includes setting a surveying machine such that the machine center situates on a vertical line passing through a measuring point defining a crossing point between a horizontal line passing through the machine center of the surveying machine and the side of the machine as the machine height point, determining a point symmetrical with the machine center with respect to a segment connecting the machine height point and a measuring point as the machine center symmetrical point, and measuring the distance between the determined machine center symmetrical point and the measuring point as the machine height. A machine height measuring device for a surveying machine includes an elongate bar and a cursor slidably disposed on the bar such that the cursor is perpendicular to the bar. The bar has a linear scale provided thereon and a tapered tip end which allows the measuring point to be indicated as a point. The cursor has an indication portion having a length equal to that of a segment connecting the machine center of the surveying machine and the machine height point, and a tapered tip end which allows the machine height point to be indicated as a point.

2 Claims, 5 Drawing Sheets

MACHINE HEIGHT MEASURING METHOD AND MACHINE HEIGHT MEASURING DEVICE FOR SURVEYING MACHINES

BACKGROUND OF THE INVENTION AND RELATED ART STATEMENT

The present invention concerns a machine height measuring method and a machine height measuring device for a surveying machine and, particularly, it relates to a machine height measuring method and a machine height measuring device for a surveying machine which is of a simple constitution and easy to use.

For measuring distance and angle by using a surveying machine, it is necessary to recognize a predetermined point as a reference for the surveying machine (machine height) and, for this purpose, machine height has been measured so far by using a tape measure. However, the measuring method using a tape measure has the disadvantage of poor measuring accuracy. Because of these considerable errors, various kinds of devices have been proposed for measuring machine height.

For instance, according to Japanese Patent Laid-Open Hei 6-194168, a delivery member disposed to a predetermined portion of a surveying machine is drawn out and put on a target, the delivered amount of the delivery member is read by an encoder, and machine height is calculated based on the read value of the encoder reading means.

Furthermore, there is a known technique of detecting machine height by an optical means (refer, for example, to Japanese Patent Laid-Open Hei 4-198809 and Hei 5-248865).

For example, the technique proposed in Japanese Patent Laid-Open Hei 4-198809 concerns a machine height measuring device comprising a telescope supported rotatably around a horizontal center axis for collimating a reference point to be observed, a reflection member disposed at a predetermined distance from the machine center point for reflecting the collimation axis of the telescope, a reflection member disposed at such an angle that the reflected collimator axis crosses a vertical line passing through the machine center point, a detection means for the angle of the telescope relative to the horizontal axis, a detection means for the angle made by the reflected collimation axis relative to the collimation axis, a calculation portion for calculating machine height based on a vertical angle or an angle of elevation of the telescope, an angle made between the collimation axis and the collimation axis reflected by the reflection member and a predetermined distance from the machine center point to the reflection member when the reference point disposed on the vertical line passing through the machine center is collimated by the telescope by way of the reflection member.

Further, the technique proposed by Japanese Patent Laid-Open Hei 5-248865 comprises converting an optical path of a measuring light emitted from an optical wave distance measuring device from a first optical member disposed ahead of an objective length of an optical wave distance measuring device downwardly at a right angle, further reflecting the emitted light from the first optical member by a second optical member and feeding back the same along the optical path to the optical wave distance measuring device thereby conducting optical wave distance measurement, measuring a distance from the machine origin to the second optical member of the optical wave distance measuring device, obtaining a distance corresponding to the machine height of the optical wave distance measuring device based on the distance and determining an accurate machine height according to the distance determined by the optical wave distance measurement and a positional relationship between the first optical member and the second optical member.

Further, as a method of using a vertical scale and a horizontal scale, a technique proposed by Japanese Utility Model Laid-Open Hei 5-6318 has been known. The technique includes a vertical scale erected vertically on a reference line by way of a stand and a horizontal scale contained in the vertical scale drawably from an optical vertical position to a horizontal direction of the vertical scale in which a line of a predetermined size from a reference line is marked to a stepped portion by merely disposing the vertical scale vertically on a reference line such as relief ink.

OBJECT AND SUMMARY OF THE INVENTION

In the technique as in Japanese Patent Laid-Open Hei 6-194186 including the delivery member and the delivery amount reading device, the size of the surveying machine is enlarged since such members and devices are incorporated, and an error is caused because calculation is conducted on the premise that the delivery amount of the delivery member is linear, while the delivery member such as a string is flexible.

Further, the technique of detecting machine height by optical means (for example, Japanese Patent Laid-Open Hei 4-198809 and Hei 5-248865) has a disadvantage that the device structure is extremely complicated and expensive.

Further, the technique proposed by Japanese Utility Model Laid-Open Hei 5-6318 merely aims for centering, in which it is required to previously draw out a rod of a horizontal scale and indicate a predetermined size from relief ink by graduation of a horizontal scale to the inner circumferential surface of a window and which can not measure machine height at the measuring point.

An object of the present invention is to provide a machine height measuring method and a machine height measuring device for a surveying machine which can be utilized simply by anyone at a certain accuracy without using a delivery technique such as a tape measure or an expensive optical technique.

The machine height measuring method for a surveying machine according to the present invention for measuring a machine height for a surveying machine which is set such that a machine center situates on a vertical line passing through a measuring point has a feature of defining a crossing point between a horizontal line passing through the center of the surveying machine and the side of the machine as the machine height point, determining a point symmetrical with the machine center with respect to a segment connecting the machine height point and a measuring point as the machine center symmetrical point, and measuring the distance between the determined machine center symmetrical point and the measuring point as machine height.

Further, the machine height measuring device for a surveying machine used for the method as described above, comprises an extensible elongate bar having a linear scale attached thereto, and a cursor capable of sliding along the bar while keeping a state perpendicular to the bar and in which the cursor is formed to a length equal with a segment connecting a machine center point of the surveying machine and a machine height point.

Referring to the machine height measuring method for a surveying machine according to the present invention with reference to FIG. 1, the machine height measuring method comprises setting a surveying machine so as to situate the machine center O on a vertical line passing through a measuring point M and measuring machine height of the surveying machine S. A crossing point between a horizontal line L1 passing through the machine center of the surveying machine S and the machine side is defined as the machine height point P, a point symmetrical with the machine center O with respect to a segment X connecting the machine height point P and the measuring point M is defined as the machine center symmetrical point Q, and a distance between the defined machine center symmetrical point Q and the measuring point M is measured as machine height.

Thus, when the point symmetrical with the machine center O with respect to the segment MP connecting the measuring point M and the machine height point P is determined as the machine center symmetrical point Q, right angle $\triangle$ MPO and right angle $\triangle$ MPQ are congruent and OM=QM, and OM (=QM) is measured as machine height by measuring QM.

Further, the measuring device according to the present invention includes an elongate member and a cursor and, since it is only required to position the top end portion of the cursor to the center point symmetrical with the machine and read the scale on the elongate bar at that position, the device is extremely simple in the constitution, easy to use and can improve the working efficiency.

Further, a mark indicating machine height is usually attached on the side of the surveying machine, and machine height can be indicated, by utilizing the position for the mark indicating machine height on the side, abutting the base end of the elongate bar against the measuring point, sliding the cursor along the elongate bar and swinging the elongate bar around the measuring point, and aligning the top end of the cursor with the machine height point, namely, with the mark on the side of the surveying machine, thereby indicating machine height at the graduation with which the cursor situates.

As described above, according to the machine height measuring method of the present invention, machine height can be measured simply by measuring the distance between the machine center symmetrical point and the measuring point from the outside of the surveying machine without using, for example, optical means or a delivery member for measuring machine height.

Further, if the cursor is made adjustable, it is only necessary to slide the cursor along the elongate bar and tilt the elongate bar, so that an appropriate machine height can be measured simply by anyone. Further, since the elongate bar can be contracted shorter, it is easy to carry about and has great practical usefulness.

DETAILED DESCRIPTION OF THE PREFERRED EMBODIMENT

The present invention will be explained by way of a preferred embodiment with reference to the drawings. The present invention is not restricted, for example, by the members and arrangements thereof to be described later and they may be modified variously within the scope of the present invention.

Figure 1:
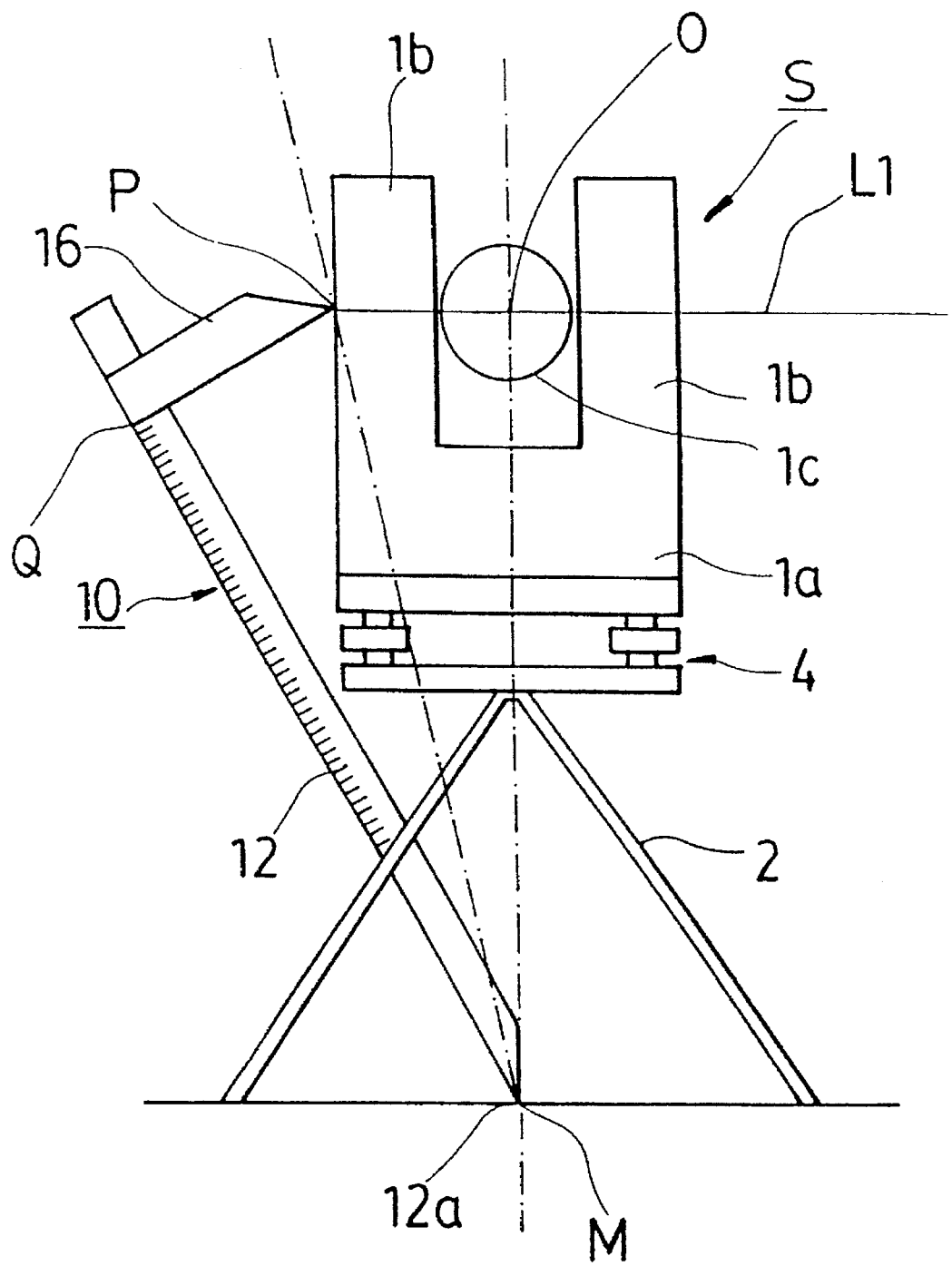
FIG. 1 is an explanatory view for explaining a measuring method according to the present invention.
Figure 2:
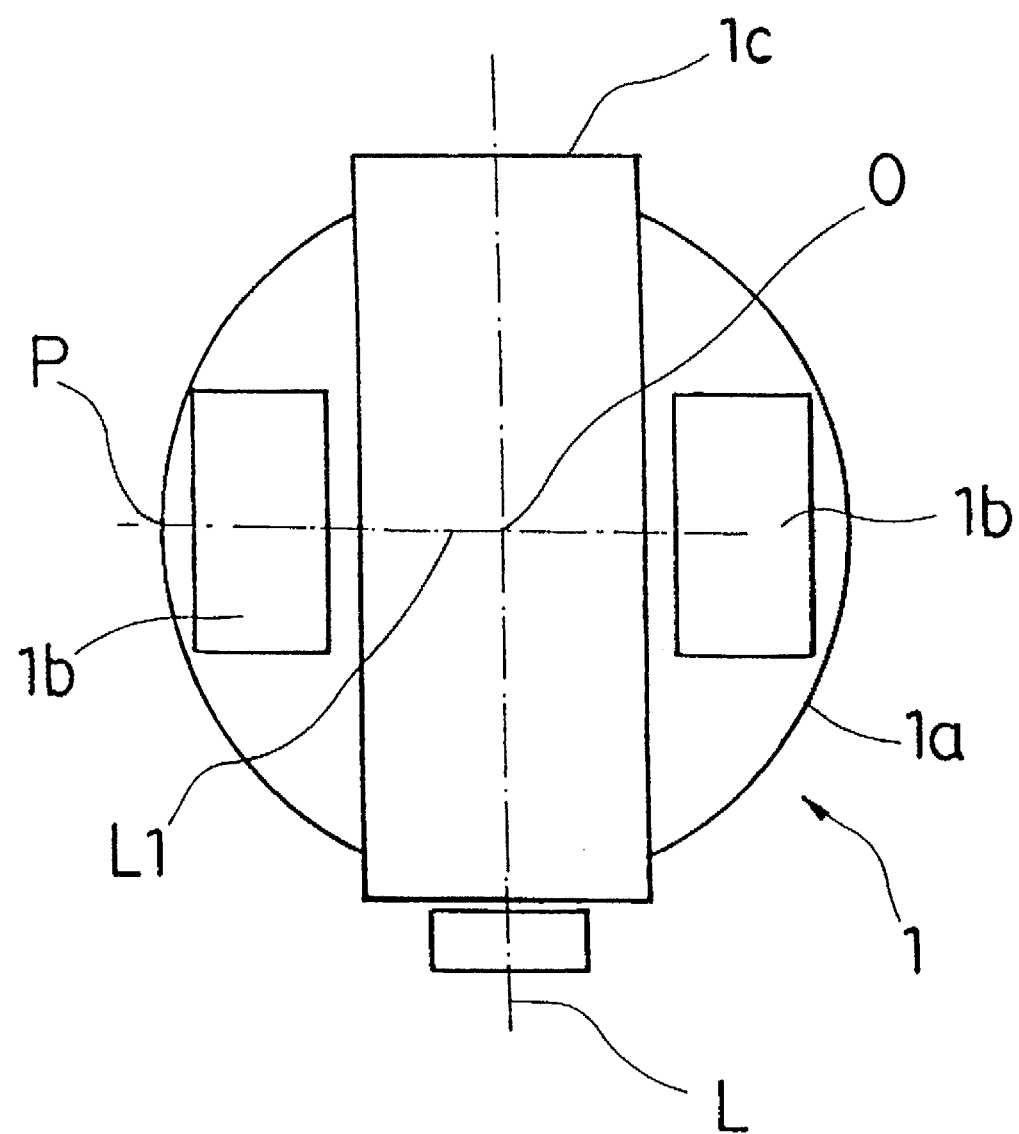
FIG. 2 is an explanatory plan view of a surveying machine for explaining the measuring method according to the present invention.
Figure 3:
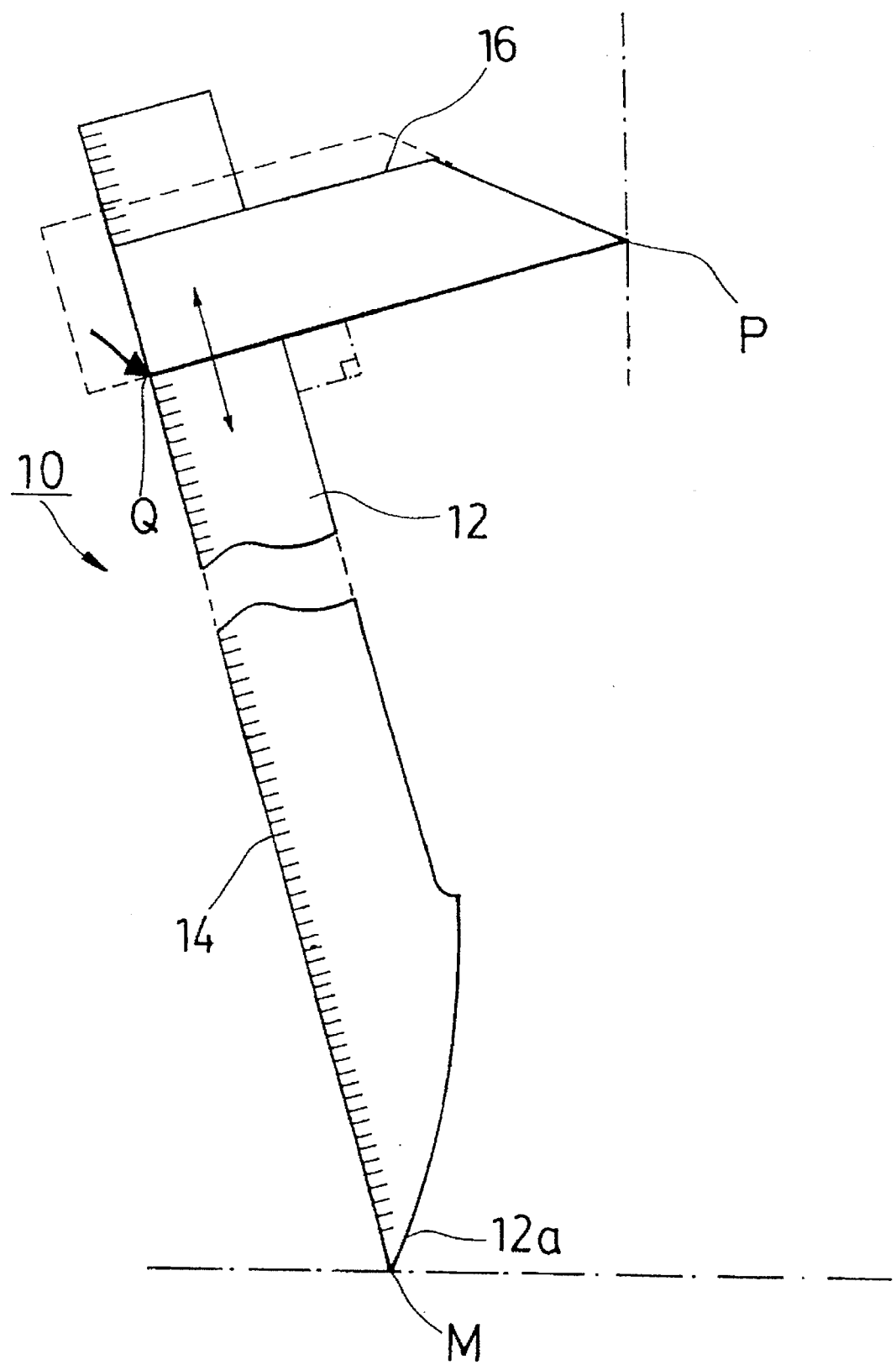
FIG. 3 is a plan view of a measuring device.

FIG. 1 and FIG. 2 explain a method of measuring machine height of a surveying machine in which FIG. 1 is an explanatory view and FIG. 2 is an explanatory plan view of a surveying machine. FIG. 3 is a plan view of a measuring device.

In FIG. 1, the main body 1 of a surveying machine S is placed on a tripod 2 by way of a leveling stand 4. In the surveying machine main body 1 of this embodiment 1, a telescope 1c is rotatably supported by studs 1b, 1b opposed in a support case 1a. The surveying machine main body is centered and leveled such that the center of the surveying machine S (machine origin) O situates on a vertical line above a measuring point M on the ground.

The machine center O in this embodiment situates at a cross point between the horizontal axis and the vertical axis, and the machine height point P is disposed on a horizontal line at machine height of the surveying machine S and on the outer side of the stud 1b of the surveying machine S. In this embodiment, a mark indicating the machine height is attached to the side of the machine and the position for the mark is defined as the machine height point P. Then, the machine center symmetry point Q as a point symmetrical with the machine center O is formed relative to a segment between the machine height P and the measuring point M (in other words, machine height P as the center), by the measuring device 10 to be described later.

The measuring device 10 comprises an elongate member 12 having a linear scale attached thereto and a cursor 16 slidable along the elongate member 12 while being kept in a state perpendicular to the elongate member 12.

The elongate bar 12 has a pointed tip 12a disposed at the top end (base end), and the length of the elongate member 12 from the tip 12a is indicated by the linear scale 14. Then, by displacing the cursor 16 while situating the tip 12a on the measuring point M, the distance from the measuring point M can be recognized. Since the tip 12a is formed, the elongate member 12 can be caused to stand accurately by the tip 12a.

The cursor 16 in this embodiment is disposed slidably relative to the elongate member 12. Then, the length of the cursor 16 (segment QP) is formed to a length equal with a distance OP between the machine center O and the machine height point P, and a segment PQ and a segment MQ are orthogonal to each other. Further, the top end of the cursor 16 is tapered and constituted such that the machine height point P can be indicated as a point.

Although the length PQ of the cursor 16 is formed to the same length as the distance OP, in this embodiment, modification can be made, for example, such that the length of the cursor 16 itself is made different from the length of the indication portion (the portion indicating the scale 14 on the elongate member 12), in which the length for the indication portion is defined as OP (portion for solid line in FIG. 3) and an indication arrow or the like is disposed to the other portion (dotted line).

In other words, while this embodiment is adapted to read a value when the linear scale 14 is aligned with the lower side of the cursor 16, it is of course possible to form an indication member separately (not illustrated) to a portion of the cursor 16 shown by the dotted line (FIG. 3) and define a portion of the linear scale 14 of the elongate member indicated by the top end of the indication member as a read value. With such a constitution, the reading position can be set to an optional position, and reading for the read value is facilitated by disposing the reading position at a portion easy to be read.

Although the embodiment described above shows an example in which the linear scale 14 is marked on the side opposite to the top end of the cursor 16, the position for the linear scale 14 is not restricted only thereto but it may be formed to an optional position of the elongate member 12 easy to be read.

The measuring operation is as follows. First, the surveying machine S is set on the measuring point M. The surveying machine is set such that the machine center O situates just above the measuring point M (on a vertical line from the measuring point M) by using a collimator telescope (not illustrated) incorporated in the surveying machine S.

Then, for measuring machine height, the elongate member is caused to stand obliquely so as not to interfere with the surveying machine S while aligning the tip 12a as the base end of the elongate member 12 of the measuring device 10 with the measuring point M. Then, the cursor is caused to slide along the elongate member 12, while the elongate member 12 is tilted around the measuring point M, to align the top end of the cursor 16 with the machine height point P. Since the machine height point P is at a position for the mark showing machine height on the machine side in this embodiment, the top end is aligned with the position for the mark. When the linear scale 14 of the elongate member 12 at which the cursor 16 situates (indicates) is read, this gives machine height.

Figure 4:
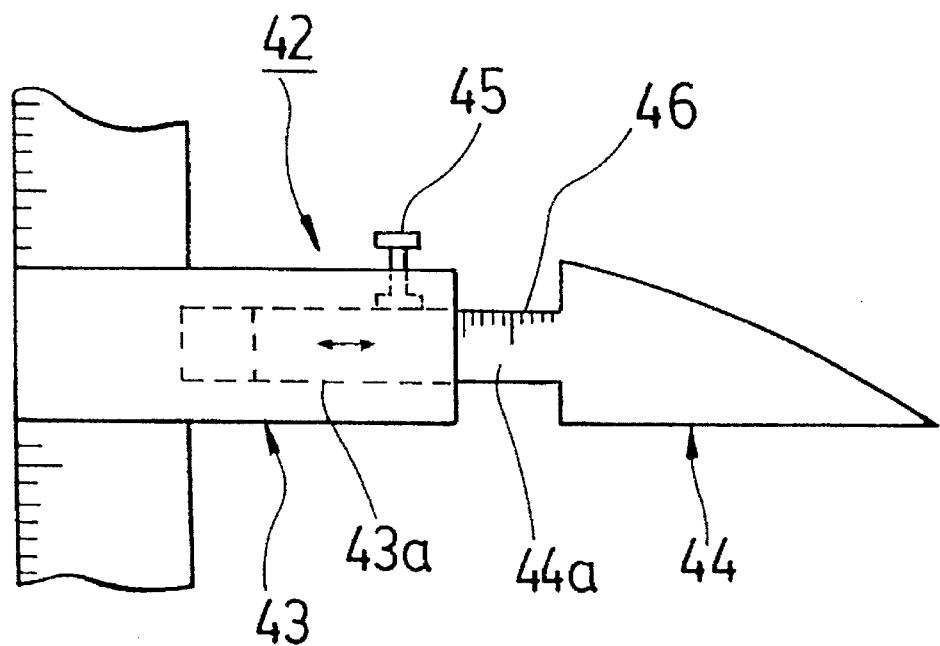
FIG. 4 is a plan view of a cursor portion illustrating another embodiment of the measuring device.

FIG. 4 is a plan view of the cursor portion showing another embodiment of the measuring device. The previous embodiment described above shows an example in which the length of the cursor or the indication portion is fixed, but this embodiment shows an example in which the length of the cursor is made extendable/contractable. Since the distance between the machine center and the support stud of the surveying machine (or the side of the surveying machine) is different depending on the type of the surveying machine, if the distance from the machine center to the side is previously known, the cursor is extended or contracted in accordance with the known distance to align with the distance OP.

The cursor 42 in this embodiment comprises a base portion 43 fixed to the elongate member 12 and having a recess 43a to which a protrusion on the side of the indication portion can be inserted, an indication portion 44 having a protrusion 44a which can be fitted into the recess 43a of the base portion 43, a fixing member 45 for fixing the recess 43a and the protrusion 44a and a scale 46, in which the length of the cursor 42 is adjustable depending on the inserted state of the recess 43a and the protrusion 44a.

Further, since the length OP is different depending on the type of the machine, a scale line for OP=QP is graduated from the top end of the indication portion 44 for the scale 46 in the machine of this embodiment, and the end of the base portion 43 is aligned with the scale depending on the type of the machine. Then, after extending the indication portion 44 to a predetermined length, the portion is fixed by the fixing member 45. The fixing member 45 in this embodiment comprises a threaded hole formed to the base portion 43, a screw 45a in threading engagement with the threaded hole and a retainer member 45b formed at the top end of the screw 45a, to fix the indication portion 44.

Figure 5:
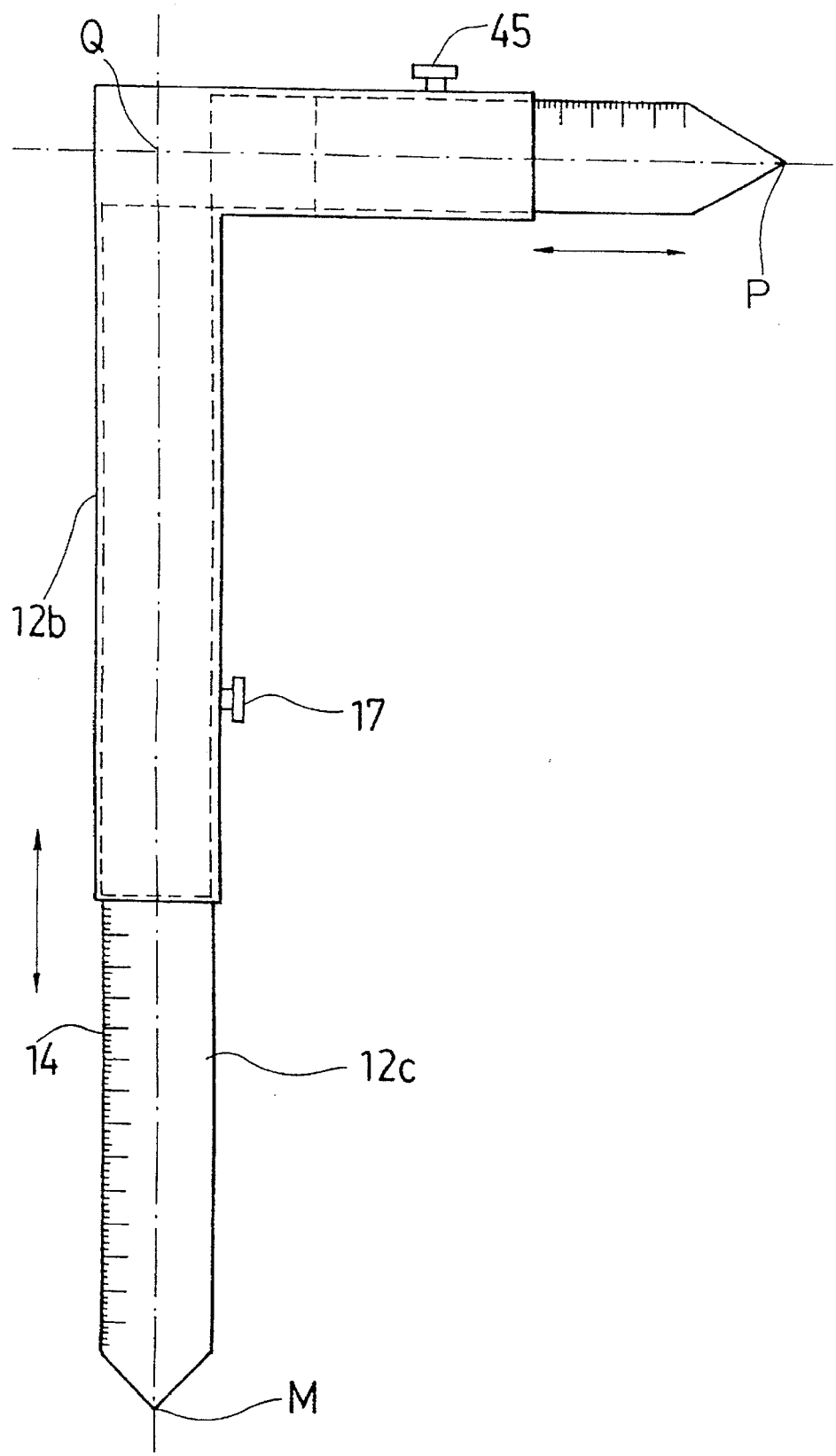
FIG. 5 is a plan view of a cursor portion illustrating a further embodiment of the measuring device.

FIG. 5 is an explanatory view illustrating a further embodiment of the measuring device. This embodiment shows an example in which a bar is made extendable/contractable, in which the same constituents as those in the previous embodiment carry the same reference numerals for which duplicate explanation will be omitted.

In this embodiment, the extensible bar 12 comprises an outer frame 12b for insertion and an inner frame 12c, in which the inner frame 12c is formed such that it can be inserted into and retracted from the outer frame 12b. For the scale, a length QM is formed as a scale line on a linear scale 14. Reference numeral 17 denotes a clamp knob.

For the arrangement of the scale 46 depending on the type of the machine, the scale is graduated depending on the type of the machine and various marking methods can be adopted. Other operations are the same as those in the previous embodiment. According to the constitution of this embodiment, the measuring device can be applied irrespective of the type of the surveying machine.

What we claim:

1. A method of measuring machine height of a surveying machine, said method comprising the steps of: setting a surveying machine such that a machine center situates on a vertical line passing through a measuring point defining a crossing point between a horizontal line passing through the machine center of said machine and a side of said machine as a machine height point, determining a point symmetrical with the machine center with respect to a segment connecting the machine height point and a measuring point as a machine center symmetrical point, and measuring the distance between the determined machine center symmetrical point and the measuring point as the machine height.

2. A machine height measuring device for a surveying machine which is set such that a machine center is situated on a vertical line passing through a measuring point, and which has a mark provided at a position which allows the mark to be viewed from the outside of said surveying machine, said mark indicating a machine height point which is located at an arbitrary position on a horizontal line passing through the machine center of said machine but which is not situated on the vertical line, wherein said machine height measuring device measures the machine height of said surveying machine utilizing said mark, and comprises:

an elongate bar having a predetermined length and a linear scale provided thereon, said bar further having a tapered tip end which allows the measuring point to be indicated as a point; and a cursor slidably disposed on said bar such that said cursor is perpendicular to said bar, said cursor having an indication portion having a length equal to that of a segment connecting the machine center of said surveying machine and the machine height point, and a tapered tip end which allows the machine height point to be indicated as a point.

\* \* \* \* \*